(12) United States Patent
Aoki et al.

(10) Patent No.: US 7,997,834 B2
(45) Date of Patent: Aug. 16, 2011

(54) RADIUS END MILL AND CUTTING METHOD

(75) Inventors: Taiitsu Aoki, Akashi (JP); Kazumasa Abe, Kobe (JP)

(73) Assignee: Mitsubishi Materials Corporation, Tokyo (JP)

( * ) Notice: Subject to any disclaimer, the term of this patent is extended or adjusted under 35 U.S.C. 154(b) by 799 days.

(21) Appl. No.: 11/996,623

(22) PCT Filed: Jul. 25, 2006

(86) PCT No.: PCT/JP2006/314665
§ 371 (c)(1),
(2), (4) Date: Jan. 24, 2008

(87) PCT Pub. No.: WO2007/013447
PCT Pub. Date: Feb. 1, 2007

(65) Prior Publication Data
US 2010/0143052 A1 Jun. 10, 2010

(30) Foreign Application Priority Data
Jul. 25, 2005 (JP) .................... 2005-214210

(51) Int. Cl.
*B23C 5/10* (2006.01)
*B23C 5/14* (2006.01)
(52) U.S. Cl. ..................... 407/54; 407/131; 407/63
(58) Field of Classification Search .......... 407/54, 407/131, 30, 42, 53, 55, 63, 61; 408/230
See application file for complete search history.

(56) References Cited

U.S. PATENT DOCUMENTS

| 5,190,420 A * | 3/1993 | Kishimoto et al. | 407/54 |
| 5,226,760 A * | 7/1993 | Nishimura | 407/54 |
| 6,846,135 B2 * | 1/2005 | Kuroda et al. | 407/53 |
| 6,997,651 B2 * | 2/2006 | Kawai et al. | 407/53 |
| 2005/0025584 A1 * | 2/2005 | Kolker et al. | 407/54 |
| 2010/0008736 A1 * | 1/2010 | Matsunaga et al. | 407/54 |

FOREIGN PATENT DOCUMENTS

| JP | UM-A-63-086921 | 6/1988 |
| JP | 2000000716 | 1/2000 |
| JP | 2001009627 | 1/2001 |
| JP | 2002-273611 | 9/2002 |

(Continued)

OTHER PUBLICATIONS

Japanese Office Action mailed Feb. 22, 2011, for the corresponding Japanese Patent Application No. 2005-214210 (English translation provided).

*Primary Examiner* — Ghassem Alie
(74) *Attorney, Agent, or Firm* — Leason Ellis LLP.

(57) ABSTRACT

A radius end mill includes an end mill body, peripheral cutting edges, bottom cutting edges and corner cutting edges. Each of the corner cutting edge is formed so as to curve toward the terminal end of the end mill body after the corner cutting edge has reached the distal end of the end mill body. A rake surface of the corner cutting edge is formed so as to be flush with the rake surface of the bottom cutting edge. When an external diameter of the end mill body is D, a value of a radius of curvature R of the corner cutting edge is greater than or equal to 0.1×D and is less than or equal to 0.3×D.

9 Claims, 2 Drawing Sheets

FOREIGN PATENT DOCUMENTS

| | | |
|---|---|---|
| JP | 2002292514 | 10/2002 |
| JP | 2003-165015 A | 6/2003 |
| JP | 2004005338 A * | 2/2004 |
| JP | 2004-82275 A | 3/2004 |
| JP | 2004-141975 | 5/2004 |
| JP | 2004-209559 A | 7/2004 |
| JP | 3590800 B1 | 8/2004 |
| WO | 2005089991 | 9/2005 |

\* cited by examiner

RADIUS END MILL AND CUTTING METHOD

CROSS REFERENCE TO PRIOR APPLICATION

This is a U.S. national phase application under 35 U.S.C. §371 of International Patent Application No. PCT/JP2006/314665 filed Jul. 25, 2006, which claims the benefit of Japanese Patent Application No. 2005-214210 filed Jul. 25, 2005, both of which are incorporated by reference herein. The International Application was published in Japanese on Feb. 1, 2007 as WO 2007/013447 A1 under PCT Article 21(2).

TECHNICAL FIELD

This invention relates to a radius end mill used to cut an object to form a mold or the like, and a cutting method using the radius end mill.

BACKGROUND OF THE INVENTION

Conventional radius end mill includes chip ejection grooves, peripheral cutting edges, bottom cutting edges and corner cutting edges. For example, each of the chip ejection grooves is formed at a peripheral portion of an end mill body located close to a distal end of the body so as to be twisted backward in the rotation direction of the end mill as the chip ejection groove approaches the terminal end of the end mill body. Each of the peripheral cutting edges is formed at a wall surface of the chip ejection groove facing forward in the rotation direction of the end mill so as to be along a ridge line of the wall surface to be close to the outer circumference of the end mill body. Each of the bottom cutting edges is formed at the wall surface of the chip ejection groove so as to be along a ridge line of the wall surface located close to the distal end of the end mill body. Each of the corner cutting edges is formed between the peripheral cutting edge and the bottom cutting edge so as to communicate the peripheral cutting edge with the bottom cutting edge, and is formed like an arcuate line which curves outward in the radial direction of the end mill body and which curves toward the distal end of the end mill body from the terminal end thereof.

Recently, in order to improve the cutting efficiency of dies, high feed-speed cutting is generally performed. The high feed-speed cutting means that the feed speed of a cutting device such as an end mill is accelerated. The high feed-speed cutting is performed, the cutting amount in the forward direction per one cutting edge is increased. Thus an outline of the cutting edge is transcribed to a surface of a material to be cut, and thereby the surface of the material becomes rough. Further, the cutting resistance acting on the cutting edge is increased, and thereby the lacking and chipping of the cutting edge may be happened. Furthermore, if the chips become large, the chips are hardly ejected from the groove easily. Therefore, the cutting resistance is increased depending upon blocking of the chips within the ejection groove, and the surface of the material to be cut is damaged by the chips.

In order to resolve the above problems, radius end mills for the high feed-speed cutting are disclosed in Japanese Patent Publication No. 3590800 ("JP '800") and Japanese Unexamined Patent Application, First Publication No. 2004-82275 ("JP '275"). With the radius end mill disclosed in JP '800, a curvature radius of the corner cutting edge is greater than or equal to 40% of the outer diameter of the end mill and is less than 50% thereof. In addition, the radius end mill is formed so that a center area of a distal end surface thereof subsides. The curvature radius of the corner cutting edge of this end mill is larger than that of conventional end mill Therefore, the outline of the cutting edge transcribed to the surface of the material to be cut becomes smooth. As a result, if the feed speed of the cutting device is increased, it is possible to make the surface of the material smooth.

With the radius end mill disclosed in JP '275, a rake surface of each corner cutting edge curves upwardly. In addition, a chip space recessed toward a distal end of an end mill body is formed at a part of the corner cutting edge located close to an outer circumference of the end mill body so as to communicate with the rake surface. Since the rake surface of the corner cutting edge of this end mill curves upwardly, the intensity of the corner cutting edge can be improved. Therefore, it is possible to generate lacking and chipping of the cutting edges. Accordingly, it is possible to stably-cut the material by the radius end mill In addition, since chips can be discharged through chip base continuously formed on the rake surface, the chips separate from the rake surface immediately. Accordingly discharge of the chips can be improved. Therefore, it is possible to prevent the chips from blocking the recessed chip space.

When a material is cut to produce dies or the like, as shown in FIG. 5, a pocket of which an opening is formed like a substantially multi-angle shape may be formed on the surface of the material. When the pocket is formed, at a part of an outline of the pocket having a number of corners, the outer circumference of the end mill contacts a side surface of the material in which the pocket is formed, thus the contact length of the cutting edge with respect to the side surface of the material is elongated. In particular, at an angle part of the pocket, the contact length of the cutting edge with respect to the side surface of the material is further elongated, thus a vibration of the end mill is caused by increase of the cutting resistance. Therefore, there is a problem that the smoothness of the surface of the material to be cut deteriorates.

Further, with the radius end mill disclosed in JP '800, the contact length of the corner cutting edge is elongated, since the curvature radius of the cutting edge is large. Thereby, the cutting resistance is increased. In particular, when the angle parts and the outline part of the pocket are cut, the contact length of the cutting edge is further elongated. Thus, the vibration of the end mill is caused by an increase of the cutting resistance. In order to prevent the end mill from vibrating, it is necessary to reduce the forward cutting speed of the end mill Therefore, there is a problem that the cutting efficiency of the material deteriorates.

With the radius end mill disclosed in JP '275, since the rake surface of the corner cutting edge curves upwardly, the contact length of the corner cutting edge is elongated. Thus the cutting resistance is increased. Therefore, similar to the radius end mill disclosed in JP '800, when the angle parts and the outline part of the pocket are cut, it is necessary to reduce the feed speed of in order to prevent the end mill from vibrating. Therefore, there is a problem that the cutting efficiency of the material deteriorates. In addition, with the radius end mill, the rake surface must be formed upwardly, and the chip space for discharging the chips must be formed. Thus, the shape of the cutting edges is extremely complicated. Therefore, there is a problem that the manufacturing cost of the radius end mill becomes to be expensive.

With the popular radius end mill having cutting edges formed into complicated shapes and which is used for the high feed-speed cutting, essential cutting edges are formed at a distal end of the radius end mill If the cutting edges are worn, the cutting edges can not be re-ground for long-term use, and thus it is disposed of after use. Therefore, the life span of the radius end mill is short, and the term of the replacement cycle is short. As a result, there is a problem that the operating cost becomes expensive.

The present invention has been conceived in order to solve the above described problem, and it is an object thereof to provide a radius end mill and a cutting method using the radius end mill When a pocket is formed in the material, the radius end mill and the cutting method of the present invention enable the high feed-speed cutting at angle parts and an outline part of the pocket to efficiently cut a material. Further, the radius end mill and the cutting method enable the material's surface to be made smooth. Furthermore, the radius end mill and the cutting method are inexpensively manufacturable. In addition, the radius end mill and the cutting method enable the cutting edges to be re-ground for long-term use.

SUMMARY OF THE INVENTION

A radius end mill of the present invention, includes: an end mill body which is rotatable around an axis; peripheral cutting edges each formed at a peripheral portion of the end mill body located close to a distal end thereof so as to extend from the distal end of the end mill body toward a terminal end thereof; bottom cutting edges each formed at a distal end surface of the end mill body so as to extend from the vicinity of the axis outward in the radial direction of the end mill; and corner cutting edges each formed between the peripheral cutting edge and the bottom cutting edge so as to communicate the peripheral cutting edge with the bottom cutting edge, each of the corner cutting edges being formed so as to protrude outward in the radial direction of the end mill body and so as to protrude from the terminal end of the end mill body toward the distal end thereof. The corner cutting edge is formed so as to curve inward in the radial direction as the corner cutting edge approaches the distal end of the end mill body from the terminal end thereof and so as to curve toward the terminal end of the end mill body after the corner cutting edge has reached the distal end of the end mill body. The bottom cutting edge is formed so as to communicate with the corner cutting edge and so as to be close to the terminal end of the end mill body as the bottom cutting edge approaches inward in the radial direction. A value of a rake angle $\alpha$ of the corner cutting edge with respect to the axis is greater than or equal to $-10°$ and is less than or equal to $10°$. A rake surface of the corner cutting edge and a rake surface of the bottom cutting edge each are formed like a plane, and the rake surface of the corner cutting edge is formed so as to be flush with the rake surface of the bottom cutting edge. When an external diameter of the end mill body is D, a value of a curvature radius R of the corner cutting edge is greater than or equal to $0.1 \times D$ and is less than or equal to $0.3 \times D$.

With the radius end mill as described above, the value of the rake angle $\alpha$ of the corner cutting edge with respect to the axis is greater than or equal to $-10°$ and is less than or equal to $10°$, that is, the value of the rake angle $\alpha$ of the corner cutting edge is substantially $0°$. In addition, the curvature radius R of the corner cutting edge is greater than or equal to $0.1 \times D$ and is less than or equal to $0.3 \times D$, that is, the curvature radius R of the corner cutting edge is larger than the diameter D of the end mill body. Thus, the contact length of the corner cutting edge with respect to the material to be cut becomes short, and thereby the cutting resistance can be reduced. As a result, it is possible to prevent the radius end mill from vibrating.

Further, since the rake surfaces of the corner cutting edge and the bottom cutting edge each are formed like a plane, and the rake surface of the corner cutting edge is flush with the rake surface of the bottom cutting edge, a rake surface of the corner cutting edge along the radial direction of the end mill body is also substantially $0°$. Thus the corner cutting edge becomes sharp, and thereby the cutting resistance is reduced. In addition, since the corner cutting edge and the bottom cutting edge can be formed easily, it is possible to produce the radius end mill inexpensively.

Furthermore, the bottom cutting edge is formed so as to communicate with the corner cutting edge and so as to be close to the terminal end of the end mill body from the distal end thereof as the bottom cutting edge approaches inward in the radial direction, in other words, the bottom cutting edge on the distal end surface of the end mill body is recessed as nearer the center of the distal end surface. Thus, when the end mill is rotated around an axis thereof, the rotation speed of the center of the distal end surface of the end mill body is substantially zero. Also, the center of the distal end surface of the end mill body does not contact the material to be cut. Therefore, the surface of the material to be cut is not damaged while the radius end mill is fed in the direction orthogonal to the axis thereof. As a result, it is possible to make the surface of the material smooth.

With regard to the radius end mill of the present invention, it may be arranged such that the value of an angle $\beta$ of the bottom cutting edge with respect to a plane being orthogonal to the axis be greater than or equal to $3°$ and be less than or equal to $8°$. Thus, if the bottom cutting edge and the corner cutting edge are abraded, the contact length of the bottom cutting edge with respect to the material to be cut is short, and the contact length of the corner cutting edge with respect to the material to be cut is also short. As a result, it is possible to reduce the cutting resistance of the cutting device.

With regard to the radius end mill of the present invention, it may be arranged such that the peripheral cutting edge be formed so as to be twisted backward in the rotation direction of the end mill as the peripheral cutting edge approaches the terminal end of the end mill body from the distal end thereof, and a value of a twist angle $\gamma$ of the peripheral cutting edge with respect to the axis be greater than or equal to $10°$ and be less than or equal to $30°$. Thus, if the peripheral cutting edge contacts the material to be cut, a contacting impact can disperse by the efficient of the twist angle. Therefore, it is possible to prevent the radius end mill from vibrating. As a result, when a multi-angle part and an outline of a pocket are cut, it is possible to perform the high feed-speed cutting to improve the cutting efficiency of the material.

In addition, the rake angle $\alpha$ may be smaller than the twist angle $\gamma$. Thus the rake surface of the corner cutting edge can be re-ground with maintaining the rake angle $\alpha$ for long-term use. As a result, it is possible to extend the life span of the end mill.

With regard to the radius end mill of the present invention, it may be arranged such that the peripheral cutting edge be provided with a back taper so that the external diameter of the end mill body reduces as the peripheral cutting edge approaches the terminal end of the end mill body from the distal end thereof, and a value of a taper angle $\theta$ of the back taper be more than $0°$ and be less than or equal to $1°$. Thus it is possible to prevent the peripheral cutting edge from contacting a side surface of the material to be cut. As a result, it is possible to prevent the radius end mill from vibrating depending on an increase of the cutting resistance. In addition, if the distal end surface of the radius end mill is ground, the outer diameter of the med mill changes little in appearance. Thus the radius end mill can be re-ground for long-term use. As a result, it is possible to extend the life span of the end mill.

With regard to the radius end mill of the present invention, clearance surfaces of the corner cutting edge and the peripheral cutting edge may be formed so that the clearance surface of the corner cutting edge communicates with the clearance surface of the peripheral cutting edge. Thus a side surface of the pocket of the material to be cut can be formed smooth. As a result, it is possible to make the side surface of the pocket smooth after cutting.

The present invention is a cutting method for cutting an object using the radius end mill as described above. With the cutting method of the present invention, a depth of cutting in the axial direction with respect to the object is less than or equal to a curvature radius R of the corner cutting edge.

With regard to the cutting method as described above, the depth of cutting in the axial direction with respect to the object is less than or equal to the curvature radius R of the corner cutting edge. Thus, when the material is cut using the radius end mill as described above, the material is cut by the bottom cutting edge and the corner cutting edge, and the peripheral cutting edge hardly contact the material. Therefore, the cutting resistance of the cutting device can be reduced. As a result, it is possible to prevent the radius end mill from vibrating, and it is possible to make the surface of the material smooth.

According to the present invention, when the pocket or the like is formed in the material, even if a multi-angle part and an outline of a pocket are cut, it is possible to perform the high feed-speed cutting to improve the cutting efficiency of the material. Further, it is possible to cut the surface of the material to be smooth. Furthermore, it is possible to produce the radius end mill inexpensively. In addition, the radius end mill can be re-ground for long-term use.

DETAILED DESCRIPTION OF THE INVENTION

An embodiment of the radius end mill of the present invention will be explained with reference to attached figures. In each of FIG. 1 to FIG. 3, the embodiment of the radius end mill of the present invention is disclosed. In FIG. 4, angle parts and an outline part of a material to be cut is disclosed when the pocket is formed in the material using the radius end mill of this embodiment.

Figure 1:
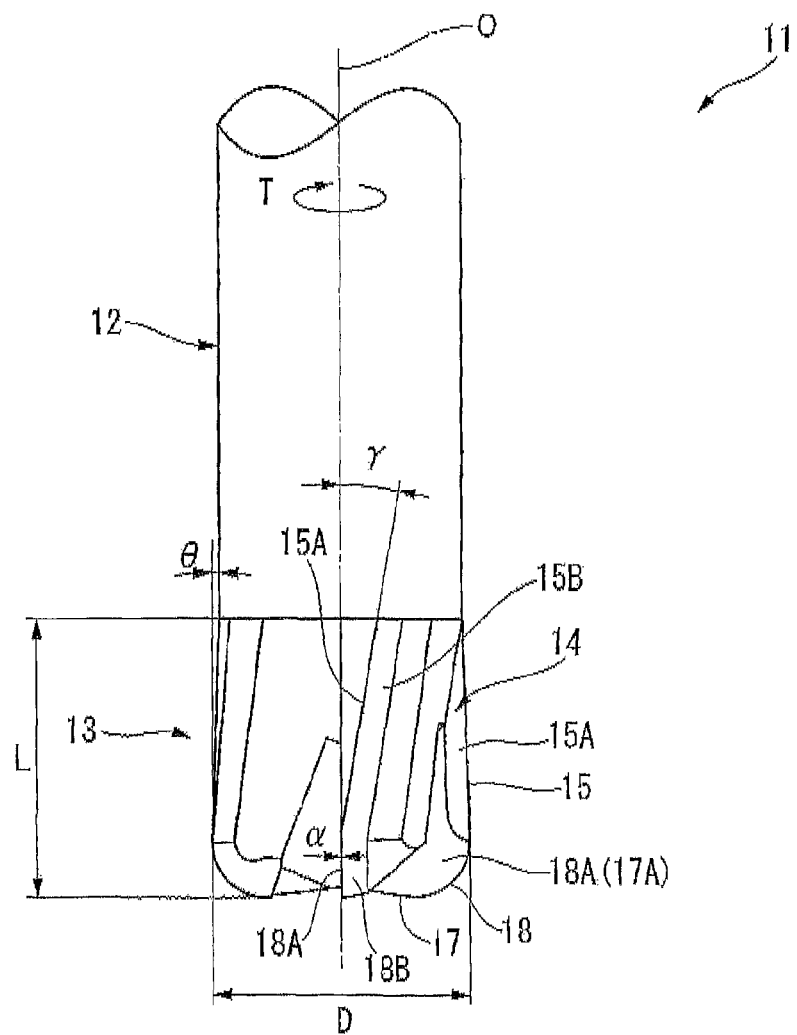
FIG. 1 is a side view of an embodiment of the radius end mill of the present invention.

An end mill body 11 is made of solid material such as ultrahard alloy. As shown in FIG. 1, the end mill body 11 is formed like a cylindrical solid column center on an axis O. A part (upper part of the end mill 11 shown in FIG. 1) of the end mill body 11 located close to a terminal end thereof is provided with a shank portion 12 which is for attaching the end mill body 11 to an end of a main shaft of a machine tool. A part (on the lower part of the end mill 11 shown in FIG. 1) of the end mill body 11 located close to a distal end thereof is provided with cutting edge portion 13.

The cutting edge portion 13 includes chip ejection grooves 14, peripheral cutting edges 15, bottom cutting edges 17 and corner cutting edges 18. The chip ejection grooves 14 are formed at the outer circumference of the cutting edge portion 13 so as to separate from each other at regular intervals in a circumferential direction of the end mill body 11 (four grooves in this embodiment). Each of the chip ejection groove 14 extends toward the terminal end of the end mill body 11 from the distal end thereof, and is formed at a peripheral portion of an end mill body located close to a distal end of the body so as to be twisted backward in the rotation direction T of the end mill around the axis O as the chip ejection groove 14 approaches the terminal end of the end mill body 11 from the distal end thereof.

Each of the peripheral cutting edge 15 is formed along a ridge line at which a wall surface of the chip ejection groove 14 facing forward in the rotation direction T of the end mill contacts a peripheral surface of the cutting edge portion 13 being continuous backward in the rotation direction T of the end mill (that is, along the ridge line of the wall surface located close to the outer circumference of the end mill body 11). Similarly to the chip ejection groove 14, the peripheral cutting edge 15 is formed so as to be twisted backward in the rotation direction T of the end mill around the axis O as the peripheral cutting edge 15 approaches the terminal end of the end mill body 11 from the distal end thereof.

Therefore, the wall surface of the chip ejection groove 14 facing forward in the rotation direction T of the end mill is a rake surface 15A of the peripheral cutting edge 15, and a part being continuous to the peripheral cutting edge 15 among the outer circumferential surface of the cutting edge portion 13 is a clearance surface 15B. A value of a twist angle $\gamma$ of the peripheral cutting edge 15 with respect to the axis O is greater than or equal to 10° and is less than or equal to 30°. Preferably, the value of the twist angle $\gamma$ is greater than or equal to 10° and is less than or equal to 20°. The clearance surface 15B of the peripheral cutting edge 15, that is, the outer circumferential surface of the cutting edge portion 13 is provided with a back taper so that the outer diameter of the cutting edge portion 13 is gradually reduced as the clearance surface 15B approaches the terminal end of the end mill body 11 from the distal end thereof. A value of a taper angle $\theta$ of this back taper is more than 0° and is less than or equal to 1° (greater than or equal to 0.8° in this embodiment).

When the outer diameter of the end mill body assumes D, a length L of the peripheral cutting edge 15 in the direction of the axis O is greater than or equal to 0.15×D and is less than or equal to 1.5×D (L=D in this embodiment).

Figure 2:
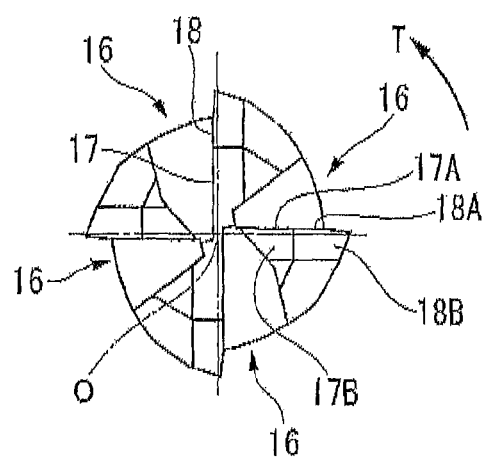
FIG. 2 is a view of the bottom surface of the radius end mill of FIG. 1 as seen in the longitudinal direction of the end mill.

End gashes 16 are formed at a top end of the cutting edge portion 13, that is, the distal end of the end mill body 11 (four gashes in this embodiment of FIG. 2). Each of the end gashes 16 communicates with the chip ejection groove 14, and is recessed inwardly in the radial direction of the end mill body 11. Each of the bottom cutting edges 17 is formed on a wall surface of the end gash 16 facing forward in the rotation direction T of the end mill so as to be along a ridge line of the wall surface located close to the distal end of the end mill body 11. The bottom cutting edge 17 extends forward in the radial direction of the end mill body 11 from the vicinity of the axis O, that is, the center of the distal end surface of the cutting edge portion 13, and is formed linearly so as to incline toward the terminal end of the end mill body 11 from the distal end thereof as the bottom cutting edge 17 approaches inwardly in the radial direction of the end mill body 11. The wall surface of the end gash 16 facing forward in the rotation direction T of the end mill is as a rake surface 17A of the bottom cutting edge 17, and a part of the distal end surface of the cutting edge portion 13 being continuous to the bottom cutting edge 17 is as a clearance surface 17B of the bottom cutting edge 17.

Each of the corner cutting edges 18 is formed between the peripheral cutting edge 15 and the bottom cutting edge 17 so as to communicate the peripheral cutting edge 15 with the bottom cutting edge 17 as seen in the rotation direction T of the end mill body 11, and is formed like an arcuate line which curves outward in the radial direction of the end mill body 11 and which curves toward the distal end of the end mill body 11 from the terminal end thereof. The corner cutting edge 18 is formed so as to curve by a curvature radius R around a center C. The center C of the curvature radius R of the corner cutting edge 18 is located closer to the distal end of the end mill body 11 than a contact point G of the peripheral cutting edge 15 and the corner cutting edge 18. That is, a length of the corner cutting edge 18 to the contact point G from the distal end of the cutting edge portion 13 along the axis O is longer than the curvature radius R.

Similarly, the center C is located more outward in the radial direction of the end mill body 11 than a contact point H of the bottom cutting edge 17 and the corner cutting edge 18. That is, the length of the corner cutting edge 18 to the contact point H to the outer circumference of the cutting edge portion 13 along the radial direction of the end mill body 11 is longer than the curvature radius R. The corner cutting edge 18 curves inwardly in the radial direction of the end mill body 11 as the corner cutting edge 18 approaches the distal end of the end mill body 11 from the terminal end thereof, and is curves toward the terminal end of the end mill body 11 between the contact point H and the center of the distal end surface of the end mill body 11.

When the outer diameter of the end mill body assumes D, a value of the curvature radius R of the corner cutting edge 18 is greater than or equal to $0.1 \times D$ and is less than or equal to $0.3 \times D$.

A value of a rake angle α of the corner cutting edge 18 with respect to the axis is greater than or equal to $-10°$ and is less than or equal to $10°$ ($0°$ in this embodiment). The rake surface 18A of the corner cutting edge 18 is formed so as to be flush with the rake surface 17A of the bottom cutting edge 17 (that is, the wall surface of the end gash 16 facing forward in the rotation direction T of the end mill). Further, the rake surface 18A of the corner cutting edge 18 and the rake surface 17A of the bottom cutting edge 17 each are formed like a plane, and the rake surface 18A of the corner cutting edge 18 is formed so as to be flush with the rake surface 17A of the bottom cutting edge 17. Therefore, a value of the corner cutting edge 18 with respect to the radial direction of the end mill body 11 is also substantially $0°$.

Furthermore, the clearance surface 18B of the corner cutting edge 18 is formed so as to communicate with the clearance surface 15B of the peripheral cutting edge 15.

In the cutting edge portion 13 from a side view as shown in FIG. 1, the rake surface 17A of the bottom cutting edge 17 and the rake surface 18A of the corner cutting edge 18 each extend toward the terminal end of the end mill body 11 from the distal end thereof along the axis O, and each communicate with the rake surface 15A of the peripheral cutting edge 15. Each rake surface 15A is formed so as to be twisted backward in the rotation direction T of the end mill as the rake surface 15A approaches the terminal end of the end mill body 11 from the distal end thereof, and each is formed so as to incline by the twist angle γ with respect to the axis O. The clearance surface 18B of the corner cutting edge 18 is formed so as to be along the rake surface 18A, and the clearance surface 18B of the corner cutting edge 18 is formed so as to be along the rake surface 15A.

The depth of the chip ejection groove 14 in a cross-sectional direction orthogonal to the axis O is less than or equal to $0.075 \times D$, and a core diameter of the end mill is greater than or equal to $0.85 \times D$. Therefore, in the rake surface 18A of the corner cutting edge 18 from a side view, a part of the rake surface 18A located outward in the radial direction of the end mill body 11 communicates with the wall surface of the chip ejection groove 14 facing forward in the rotation direction T of the end mill to form the rake surface 15A of the peripheral cutting edge 15.

Figure 3:
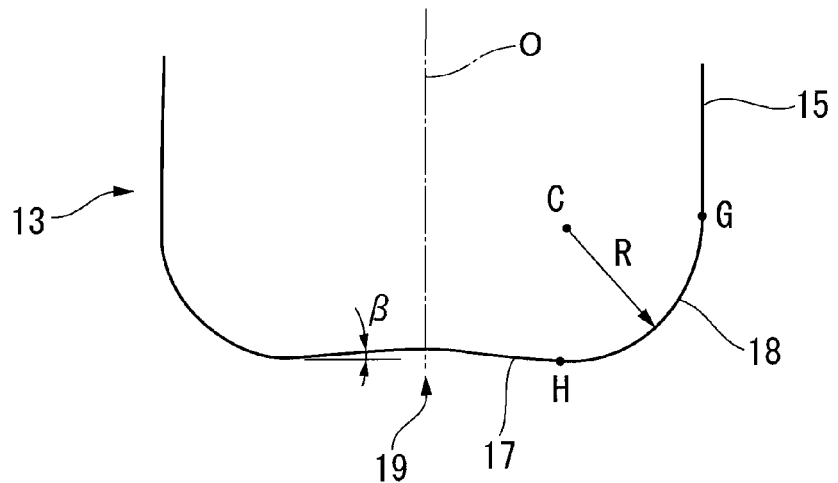
FIG. 3 is a view for using of explanation of the distal end shape of the radius end mill of FIG. 1.
Figure 4:
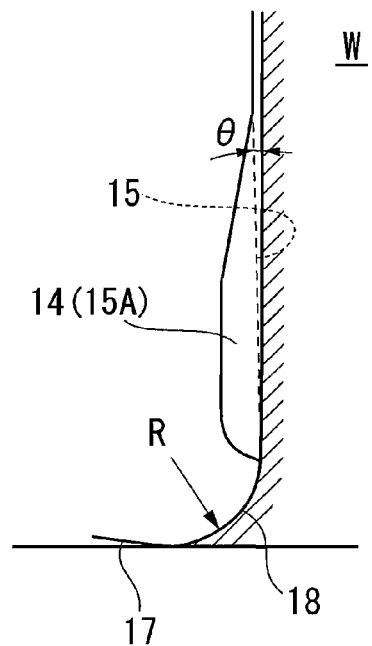
FIG. 4 is a view for using of explanation of cutting of the material by the radius end mill of FIG. 1.
Figure 5:
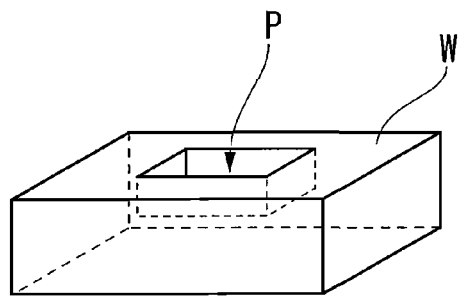
FIG. 5 is a view showing the shape of the pocket formed in the material.

As shown in FIG. 3, a recessed portion 19 is formed at the center area of the distal end surface of the cutting edge portion 13. The bottom cutting edge 17 communicates with the corner cutting edge 18 and inclines toward the terminal end of the end mill body 11 as the bottom cutting edge 17 approaches inward in the radial direction of the end mill body 11, and thereby the recessed portion 19 is formed. The value of an angle β of the bottom cutting edge 17 which forms the recessed portion 19 with respect to a plane orthogonal to the axis O is greater than or equal to $3°$ and is less than or equal to $8°$ ($6°$ in this embodiment).

The radius end mill as described above is attached to the end of the main shaft of the machine tool through the shank portion 12. Then, the radius end mill is fed in the direction orthogonal to the axis O along with being rotated around the axis O, and thereby the radius end mill cuts the material W so as to form a pocket or the like. The radius end mill is used to perform the high feed-speed cutting of which the feed speed in the direction orthogonal to the axis O is high.

When the cutting of the material is performed using the radius end mill of this embodiment, the depth of cutting in the direction of the axis O with respect to the material W is less than or equal to the curvature radius R of the corner cutting edge 18.

In the radius end mill as described above, the length of the corner cutting edge 18 to the contact point G from the distal end of the cutting edge portion 13 along the axis O is longer than the curvature radius R, and the peripheral cutting edge 15 is located so as to separate from the distal end of the cutting edge portion 13 toward the terminal end of the end mill body 11 more than the curvature radius R. Thus, when the depth of cutting in the direction of the axis O is set as mentioned above, the corner cutting edges 18 and the bottom cutting edges 17 are mainly used to cut, and the peripheral cutting edges 15 are not used to cut. Therefore, the contact length of the cutting edge portion 13 with respect to the material W can be shortened, and thereby the cutting resistance of the cutting device can be reduced. As a result, it is possible to prevent the radius end mill from vibrating. Accordingly, it is possible to make the surface of the material smooth.

In the radius end mill as described above, the value of the rake angle α of the corner cutting edge 18 with respect to the axis O is $0°$, and the rake angle of the corner cutting edge 18 with respect to the radial direction of the end mill body 11 is also $0°$. Further, the curvature radius R of the corner cutting edge 18 is less than or equal to $0.3 \times D$ (D is the outer diameter of the end mill). Therefore, the contact length of the corner cutting edge 18 with respect to the material W can be shortened, and thereby the cutting resistance of the cutting device can be reduced. As a result, it is possible to prevent the radius end mill from vibrating and it is possible to prevent the cutting edge portion 13 from generating lacks and chipping. Accordingly, it is possible to stably cut the material by the radius end mill In addition, the curvature radius R of the corner cutting edge 18 is greater than or equal to $0.1 \times D$. Thus, when the high feed-speed cutting is performed, the surface of the material W to which the outline of the corner cutting edge 18 is transcribed can be smoothly formed, and thereby it is possible to make the surface of the material smooth.

Since the rake surface 18A of the corner cutting edge 18 and the rake surface 17A of the bottom cutting edge 17 each are formed as a plane, and the rake surface 18A of the corner cutting edge 18 is formed so as to be flush with the rake surface 17A of the bottom cutting edge 17, the sharpness of the corner cutting edge 18 can be improved, and thereby the cutting resistance of the cutting device can be reduced. In addition, since the corner cutting edge and the bottom cutting edge can be formed easily, it is possible to produce the radius end mill inexpensively.

The value of the angle β of the bottom cutting edge 17 with respect to the plane orthogonal to the axis O is greater than or equal to 3° and is less than or equal to 8° (6° in this embodiment). Thus, if the bottom cutting edge 17 and the corner cutting edge 18 become worn, each of the contact length of the bottom cutting edge 18 with respect to the material W and the contact length of the corner cutting edge 18 with respect to the material W remains short. Therefore, it is possible to reduce the cutting resistance of the cutting device, and it is possible to prevent the radius end mill from vibrating. As a result, it is possible to make the surface of the material smooth.

The recessed portion 19 is formed at the center area of the distal end surface of the cutting edge portion 13. Thus, when the end mill is rotated around the axis O, the rotation speed of the center of the distal end surface of the end mill body 11 is substantially zero. Also, the center of the distal end surface of the end mill body 11 does not contact the material W. Therefore, the surface of the material W is not damaged while the radius end mill is fed in the direction orthogonal to the axis O. As a result, it is possible to make the surface of the material smooth.

The peripheral cutting edge 15 is formed so as to be twisted backward in the rotation direction T of the end mill as the peripheral cutting edge 15 approaches the terminal end of the end mill body 11 from the distal end thereof, and the twist angle γ of the peripheral cutting edge 15 with respect to the axis O is greater than or equal to 10° and is less than or equal to 30°. Thus, when the multi-angle part and the outline of the pocket P are cut, if the peripheral cutting edge contacts the material to be cut, the contacting impact can disperse by the efficient of the twist angle. Therefore, it is possible to prevent the radius end mill from vibrating. As a result, when the multi-angle part of the pocket and the outline of the material are cut, it is possible to perform the high feed-speed cutting to improve the cutting efficiency of the material W.

The clearance surface 15B of the peripheral cutting edge 15 is provided with the back taper so that the outer diameter of the cutting edge portion 13 is gradually reduced as the clearance surface 15B approaches the terminal end of the end mill body 11 from the distal end thereof. The value of the taper angle θ of this back taper is more than 0° and is less than or equal to 1° (greater than or equal to 0.8° in this embodiment). Thus, when the multi-angle part and the outline of the pocket P are cut, as shown in FIG. 4, only the corner cutting edge 18 contacts the material W, and the peripheral cutting edge 15 does not contact the material W. Therefore, it is possible to reduce the cutting resistance of the cutting device.

The length L of the peripheral cutting edge 15 in the direction of the axis O is greater than or equal to 0.15×D and is less than or equal to 1.5×D (L=D in this embodiment). The value of the back taper angle θ is more than 0° and is less than or equal to 1°. Thus, in a case where the bottom cutting edge 17 and the corner cutting edge 18 are worn, if the distal end surface of the radius end mill is ground, the outer diameter of the med mill changes little in appearance. Thus the radius end mill can be re-ground for long-term use. As a result, it is possible to extend the life span of the end mill.

In the radius end mill of this embodiment, the value of the rake angle α of the corner cutting edge 18 is 0°, and is the value of the twist angle γ of the peripheral cutting edge 15 is greater than or equal to 10° and is less than or equal to 30°. That is, the rake angle α is smaller than the twist angle γ. Thus the rake surface 18A of the corner cutting edge 18 can be re-ground with maintaining the rake angle α for long-term use. As a result, it is possible to improve the life span of the end mill.

The clearance surface 18B of the corner cutting edge 18 is formed so as to smoothly communicate with the clearance surface 15B of the peripheral cutting edge 15. Thus, when the multi-angle part and the outline of the pocket P are cut, it is possible to make the surface of the material W in which the pocket P is formed smooth.

The depth of the chip ejection groove 14 in the cross-sectional direction orthogonal to the axis O is less than or equal to 0.075×D, and the core diameter of the radius end mill is greater than or equal to 0.85×D. Thus it is possible to improve the rigidity of the end mill body 11. In addition, it is possible to prevent the radius end mill from vibrating depending on the increase of the cutting resistance, and thereby the high feed-speed cutting can be performed stably.

In this embodiment, the four-edge end mill has been explained. The end mill is provided with four chip ejection grooves, and is provided with four peripheral cutting edges, four bottom cutting edges and four corner cutting edges. However, the radius end mill of the present invention has not limitations with regard to the number of the peripheral cutting edges, the bottom cutting edges and the corner cutting edges, and the radius end mill may be provided with five or more cutting edges, or may be provided with three or less cutting edges.

With regard to the radius end mill of the present invention, film of hard material such as TiN and TiAlN may be coated on the surface of each of the cutting edges. Thereby, the wear resistance of the cutting edges is highly improved, thus it is possible to further extend the life span of the end mill.

The invention claimed is:
1. A radius end mill comprising:
an end mill body which is rotatable around an axis;
peripheral cutting edges each formed at a peripheral portion of the end mill body located close to a distal end thereof so as to extend from the distal end of the end mill body toward a terminal end thereof;
bottom cutting edges each formed at a distal end surface of the end mill body so as to extend from the vicinity of the axis outward in the radial direction of the end mill; and
corner cutting edges each formed between the peripheral cutting edge and the bottom cutting edge so as to communicate the peripheral cutting edge with the bottom cutting edge, each of the corner cutting edges being formed so as to protrude outwardly in the radial direction of the end mill body and so as to protrude from the terminal end of the end mill body toward the distal end thereof; wherein:
the corner cutting edge is formed so as to curve inward in the radial direction as the corner cutting edge approaches the distal end of the end mill body from the terminal end thereof and so as to curve toward the terminal end of the end mill body after the corner cutting edge has reached the distal end of the end mill body;
the bottom cutting edge is formed so as to communicate with the corner cutting edge and so as to be close to the terminal end of the end mill body as the bottom cutting edge approaches inwardly in the radial direction;

the value of a rake angle $\alpha$ of the corner cutting edge with respect to the axis is greater than or equal to $-10°$ and is less than or equal to $10°$;

a rake surface of the corner cutting edge and a rake surface of the bottom cutting edge each are formed as a plane, and the rake surface of the corner cutting edge is formed so as to be flush with the rake surface of the bottom cutting edge;

the corner cutting edge is formed so as to curve by a radius of curvature (R) around a center;

the center of the radius of curvature (R) of the corner cutting edge is located closer to the distal end of the end mill body than a contact point (G) of the peripheral cutting edge and the corner cutting edge; and when an external diameter of the end mill body is (D), the value of the curvature radius R of the corner cutting edge is greater than or equal to $0.1 \times (D)$ and is less than or equal to $0.3 \times (D)$.

2. The radius end mill according to claim 1, wherein a value of an angle ($\beta$) of the bottom cutting edge with respect to a plane being orthogonal to the axis is greater than or equal to $3°$ and is less than or equal to $8°$.

3. The radius end mill according to claim 1, wherein the peripheral cutting edge is formed so as to be twisted backward in the rotation direction of the end mill as the peripheral cutting edge approaches the terminal end of the end mill body from the distal end thereof, a value of a twist angle ($\gamma$) of the peripheral cutting edge with respect to the axis is greater than or equal to $10°$ and is less than or equal to $30°$, and the rake angle ($\alpha$) is smaller than the twist angle ($\gamma$).

4. The radius end mill according to claim 3, wherein the peripheral cutting edge is provided with a back taper so that the external diameter of the end mill body reduces as the peripheral cutting edge approaches the terminal end of the end mill body from the distal end thereof, and a value of a taper ($\theta$) of the back taper is more than $0°$ and is less than or equal to $1°$.

5. The radius end mill according to claim 3, wherein clearance surfaces of the corner cutting edge and the peripheral cutting edge are formed so that the clearance surface of the corner cutting edge communicates with the clearance surface of the peripheral cutting edge.

6. A cutting method for cutting an object using the radius end mill according to claim 1, wherein a depth of cutting in the axial direction with respect to the object is less than or equal to a curvature radius R of the corner cutting edge.

7. The radius end mill according to claim 2, wherein the peripheral cutting edge is formed so as to be twisted backward in the rotation direction of the end mill as the peripheral cutting edge approaches the terminal end of the end mill body from the distal end thereof, a value of a twist angle ($\gamma$) of the peripheral cutting edge with respect to the axis is greater than or equal to $10°$ and is less than or equal to $30°$, and the rake angle ($\alpha$) is smaller than the twist angle ($\gamma$).

8. The radius end mill according to claim 7, wherein the peripheral cutting edge is provided with a back taper so that the external diameter of the end mill body reduces as the peripheral cutting edge approaches the terminal end of the end mill body from the distal end thereof, and a value of a taper ($\theta$) of the back taper is more than $0°$ and is less than or equal to $1°$.

9. The radius end mill according to claim 7, wherein clearance surfaces of the corner cutting edge and the peripheral cutting edge are formed so that the clearance surface of the corner cutting edge communicates with the clearance surface of the peripheral cutting edge.

* * * * *